(12) United States Patent
Carroll

(10) Patent No.: US 6,854,058 B2
(45) Date of Patent: Feb. 8, 2005

(54) LOW-INTERFERENCE COMMUNICATIONS DEVICE USING CHAOTIC SIGNALS

(75) Inventor: Thomas L. Carroll, Alexandria, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 715 days.

(21) Appl. No.: 09/839,146

(22) Filed: Apr. 23, 2001

(65) Prior Publication Data

US 2003/0007638 A1 Jan. 9, 2003

(51) Int. Cl.[7] ............................................... G06F 1/24
(52) U.S. Cl. ......................... 713/168; 713/200; 713/201
(58) Field of Search ................................ 713/168, 200, 713/201

(56) References Cited

U.S. PATENT DOCUMENTS

| | | | |
|---|---|---|---|
| 5,655,022 A | | 8/1997 | Carroll |
| 5,930,231 A | * | 7/1999 | Miller et al. ................ 370/210 |
| 5,978,650 A | * | 11/1999 | Fischer et al. ................ 725/73 |
| 6,049,535 A | * | 4/2000 | Ozukturk et al. ........... 370/335 |
| 6,148,006 A | * | 11/2000 | Dyke et al. .................. 370/480 |

* cited by examiner

Primary Examiner—Thomas R. Peeso
(74) Attorney, Agent, or Firm—John J. Karasek; John Gladstone Mills, III

(57) ABSTRACT

The low-interference communications device uses chaotic signals which are almost periodic. A chaotic circuit driven by a sine wave signal from a function generator is produced which has narrow-band features in the power spectrum. An information signal is encoded on the chaotic signal by modulating the phase of the sine wave that drives the chaotic circuit. Periodic (narrow-band) components are then removed from the chaotic signal and the chaotic signal is transmitted to a receiver device. The chaotic signal is nonlinear, so the narrow band and broad band parts of the chaotic signal have been modulated together. The transmitted signal is relatively flat, so it will not interfere with other communications signals. At the receiver, the nonlinear chaotic signal is restored by performing a nonlinear operation on the received signal, such as squaring or cubing, to remove the narrowband components. Then the information modulated onto the narrow band component is detected. When this is accomplished it is possible to detect variations in the phase of the base frequency.

10 Claims, 17 Drawing Sheets

NONAUTONOMOUS DUFFING CHAOTIC CIRCUIT

CIRCUIT USED TO CREATE A FUNCTION G
IN THE CHAOTIC DUFFING CIRCUIT

CIRCUIT TO CREATE A FUNCTION F IN THE
CHAOTIC DUFFING CIRCUIT

CIRCUIT USED TO SUBTRACT THE PERIODIC
PARTS FROM THE CHAOTIC DUFFING "y" SIGNAL

CIRCUIT IN RECEIVER THAT RESTORES THE PERIODIC
PART OF THE CHAOTIC SIGNAL

PHASE LOCKING CIRCUIT USED WITH THE CHAOTIC PLR CIRCUIT

LOW-INTERFERENCE COMMUNICATIONS DEVICE USING CHAOTIC SIGNALS

BACKGROUND OF THE INVENTION

1. Field of the Invention

The invention relates generally to a device for transmitting electronic signals and more specifically to a device for transmitting an electromagnetic signal having a flat spectrum that produces little interference with other communications signals utilizing.

2. Description of the Related Art

Chaos is a complex form of motion that is not periodic and never repeats itself produced by systems which contain both some form of instability (such as a positive feedback) and at least one nonlinearity. The chaotic system produces motions that are almost periodic, however, as exemplified by large spikes in the power spectrum, but it never actually repeats. What occurs is that there is some instability in a chaotic circuit caused by an unstable feedback that makes any sort of periodic motion unstable. If two chaotic circuits are started off with a small variation in initial conditions their motion will diverge exponentially; therefore, chaotic motion is unpredictable. The signal exiting a chaotic circuit will be a chaotic signal.

It is easy to produce complex chaotic signals using simple analog electronic circuits, so chaotic circuits can make very simple generators for broadband signals. A chaotic system is nonlinear and produces a broadband signal. The chaotic signals are not periodic and never repeat, but in some cases they may contain signals that are almost periodic.

There are many different methods for removing the periodic components from a chaotic signal. One may remove the periodic components directly with bandstop filters, or isolate the periodic components with bandpass filters and subtract from the chaotic signal, or reproduce the periodic components without filters and subtract from the chaotic signal.

The behavior of chaotic systems has been well studied in recent years. Because chaotic systems contain instabilities, they have broad power spectra, although there may also be some narrow features in the chaotic spectrum. If these narrow features are removed, only the broad spectrum remains. As previously stated, chaotic systems are nonlinear, however, so that the narrow parts of the spectrum still exist, but they are mixed with the broad parts. Applying a nonlinear function to the chaotic signal can restore the narrow parts of the signal. It is possible to encode information of the narrow part of the chaotic spectrum, remove the narrow part of the spectrum so only a broad-band signal is present, and then recover the narrow band part in a receiver in order to read the information.

It is well known that chaotic signals are broad band, nonperiodic signals and that they may be produced by simple electronic circuits. In addition, some chaotic systems produce signals that are cyclostationarity, which means that a signal, y(t), from the chaotic system can have a mean E[y(t)] which is nonstationary and is a periodic function of time, where E is the expectation of y(t), this is well known to those skilled in the art. One method for detecting cyclostationarity in a signal is to take the autocorrelation of the power spectrum. Using a well-known theorem that states that the cross-correlation of two signals is equal to the product of their Fourier transforms, the autocorrelation of the power spectrum of a signal is proportional to the square of that signal. Therefore, any function which includes taking a product of a chaotic time series with itself may be used to detect cyclostationarity in that chaotic time series.

For certain applications, such as garage door openers, remote controls, portable phones, etc., the Federal Communication Commission (FCC) has set aside frequency bands for commercial communications that are unlicensed. One requirement to use these bands is that the transmitter have a flat spectrum to avoid interfering with other communications systems. The regulations promulgated by the FCC are designed to prevent the unlicensed devices from interfering with other communications. The regulations require that the transmitted signal have a relatively flat power spectrum.

There are well known spread spectrum technologies consisting of frequency hopping or direct sequences techniques which produce transmitted spectra that fall within the within the FCC rules. Existing spread spectrum methods can meet these requirements however, a problem is that the receivers and transmitters comprising these systems are complicated and therefore expensive. These circuits need digital circuitry to generate pseudorandom numbers which have to be synchronized with the receiving end. This synchronization is usually accomplished through the use of a preamble on the signal.

SUMMARY OF THE INVENTION

An object of this invention is to provide a device for transmitting an electromagnetic signal having a flat spectrum that produces little interference with other communications signals.

This and other objects are accomplished by the low-interference communications device using chaotic signals which are almost periodic. A chaotic circuit driven by a sine wave signal from a function generator is produced which has narrow-band features in the power spectrum. An information signal is encoded on the chaotic signal by modulating the phase of the sine wave that drives the chaotic circuit. Periodic (narrow-band) components are then removed from the chaotic signal and the chaotic signal is transmitted to a receiver device. The chaotic signal is nonlinear, so the narrow band and broad band parts of the chaotic signal have been modulated together. The transmitted signal is relatively flat, so it will not interfere with other communications signals. At the receiver, the nonlinear chaotic signal is restored by performing a nonlinear operation on the received signal, such as squaring or cubing, to remove the narrow-band components. Then the information modulated onto the narrow band component is detected. When this is accomplished it is possible to detect variations in the phase of the base frequency.

DESCRIPTION OF THE PREFERRED EMBODIMENT

Figure 1A:
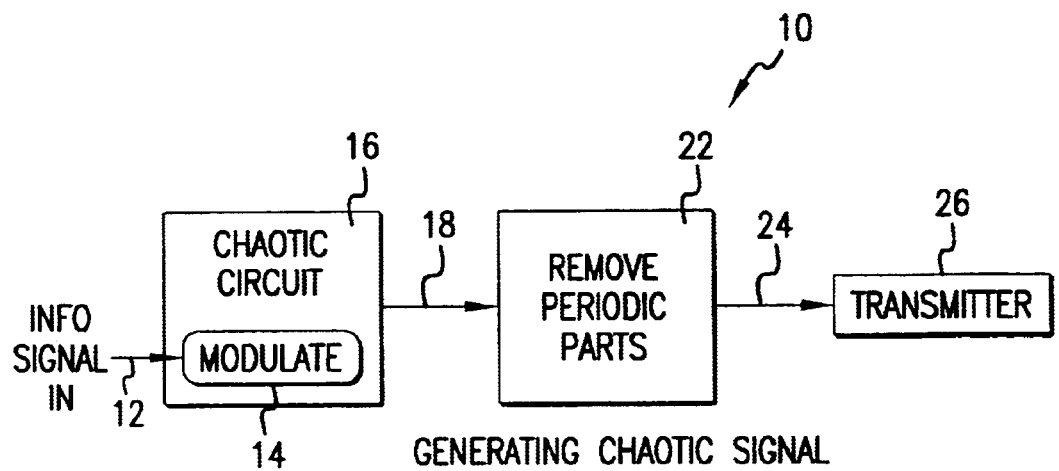
FIG. 1(a) shows a block diagram of the low-interference communications system for generating a chaotic signal.
Figure 1B:
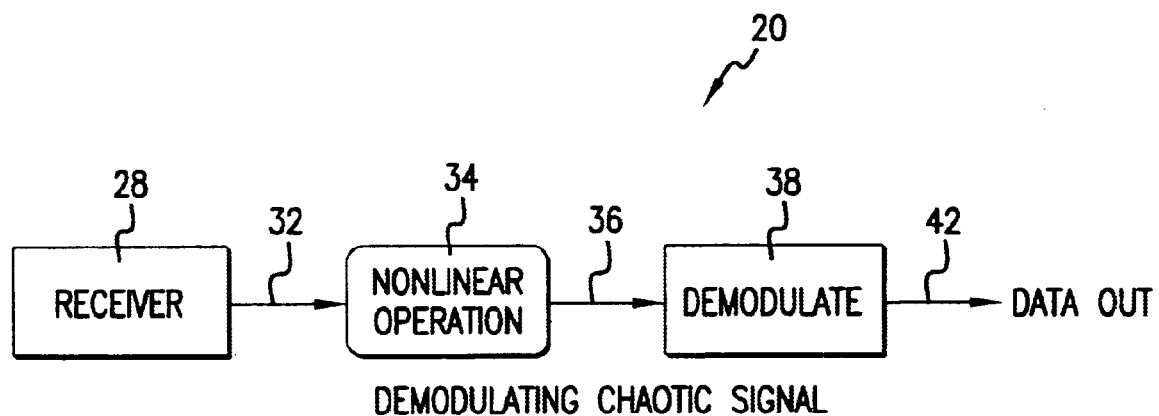
FIG. 1(b) shows a block diagram of the low-interference communications system for demodulating a chaotic signal.

This transmitter portion 10 of this invention, as shown in FIG. 1(a), invention produces a transmitted signal 24 with a flat transmitted spectrum, this signal will produce little interference with other communications signals and is much easier to produce than the prior art in the field. As previously stated, chaotic systems are nonlinear and produce a broadband signal which may have strong peaks within the signal, especially if there is a driving force in the system. The chaotic system 16 is a chaotic system which has nearly periodic motion which creates large peaks in the power spectrum of the output signal 18. The information signal 12 is input into the modulator 14 which modulates the information onto the nearly periodic part of the chaotic system 16, which produces output signal 18. The periodic parts of the output signal 18 are removed in a periodic suppression unit 22, produces a broadband signal 24 which is output to a transmitter 26. The narrowband portion of the signal 24 still preserves the phase of the narrowband part that has been removed, so at the receiver portion 20 of this system, as shown in FIG. 1(b), nonlinear operations such as squares or cubes is accomplished. That action restores signals at the narrowband frequencies or at multiples of the narrowband frequencies. This can be accomplished any polynomial operation that will recover the phase of the original signal. The phase of the original chaotic signal is then recovered by measuring the phase of the periodic signal at the output. By performing the nonlinear operation 34 on the signal 32 from the receiver 28, encoded information can be demodulated 38 recovered as data output 42. The demodulator 38 utilized is a standard demodulator 38. If the signal is phase modulated or frequency modulated, a compatible demodulator 0.38 must be utilized. The output 42 data may be binary or voice data.

The advantage of the current invention over existing spread spectrum technology is that the current invention will have a flat spectrum but that it is very simple and inexpensive, so it will be useful for commercial applications. Because the technology taught herein is so simple, it is conceivable that "throw-away" transmitters or receivers could be produced.

Figure 6:
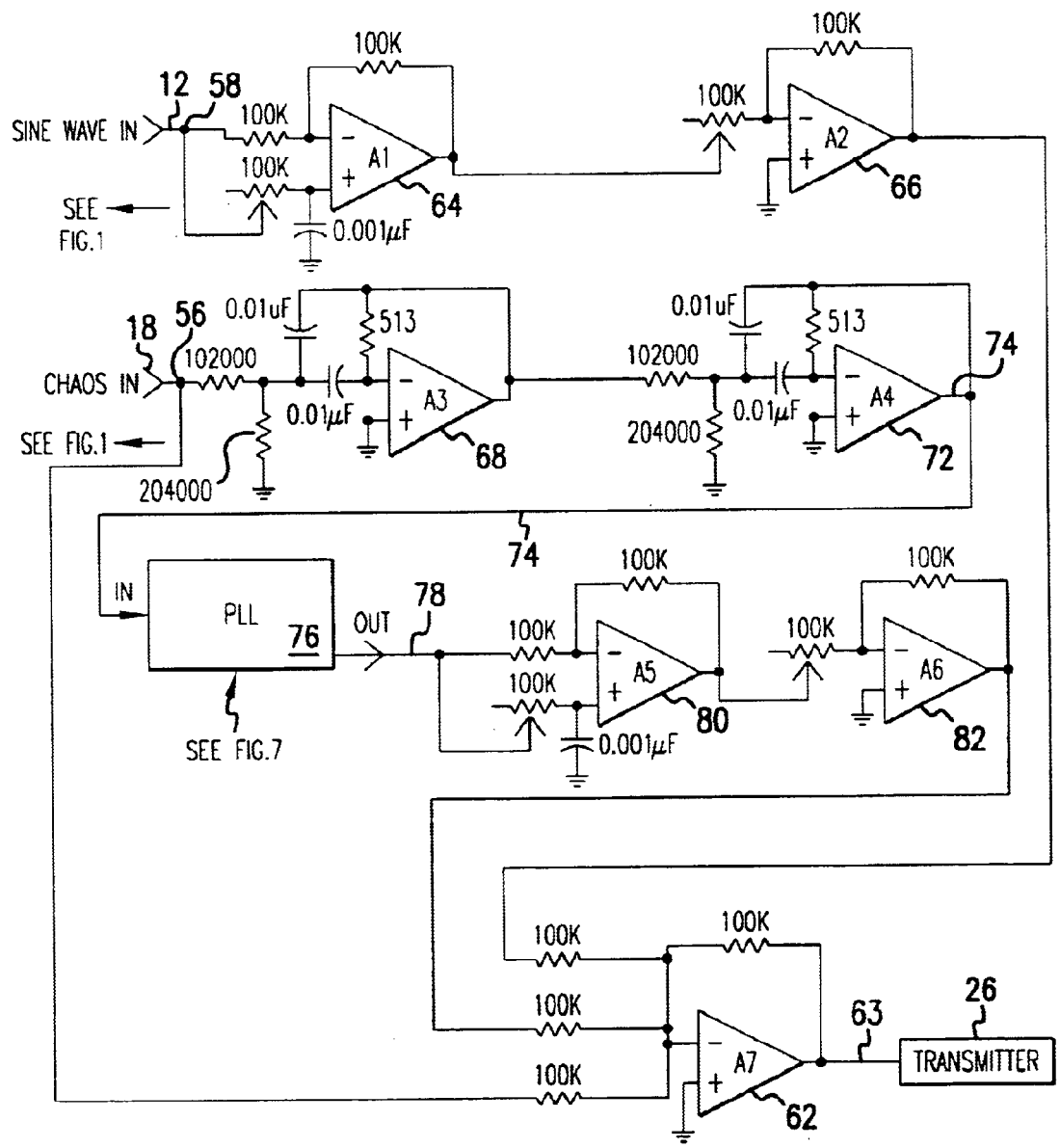
FIG. 6 shows a schematic of a circuit used to subtract periodic parts from the chaotic Duffing "y" signal.
Figure 14:
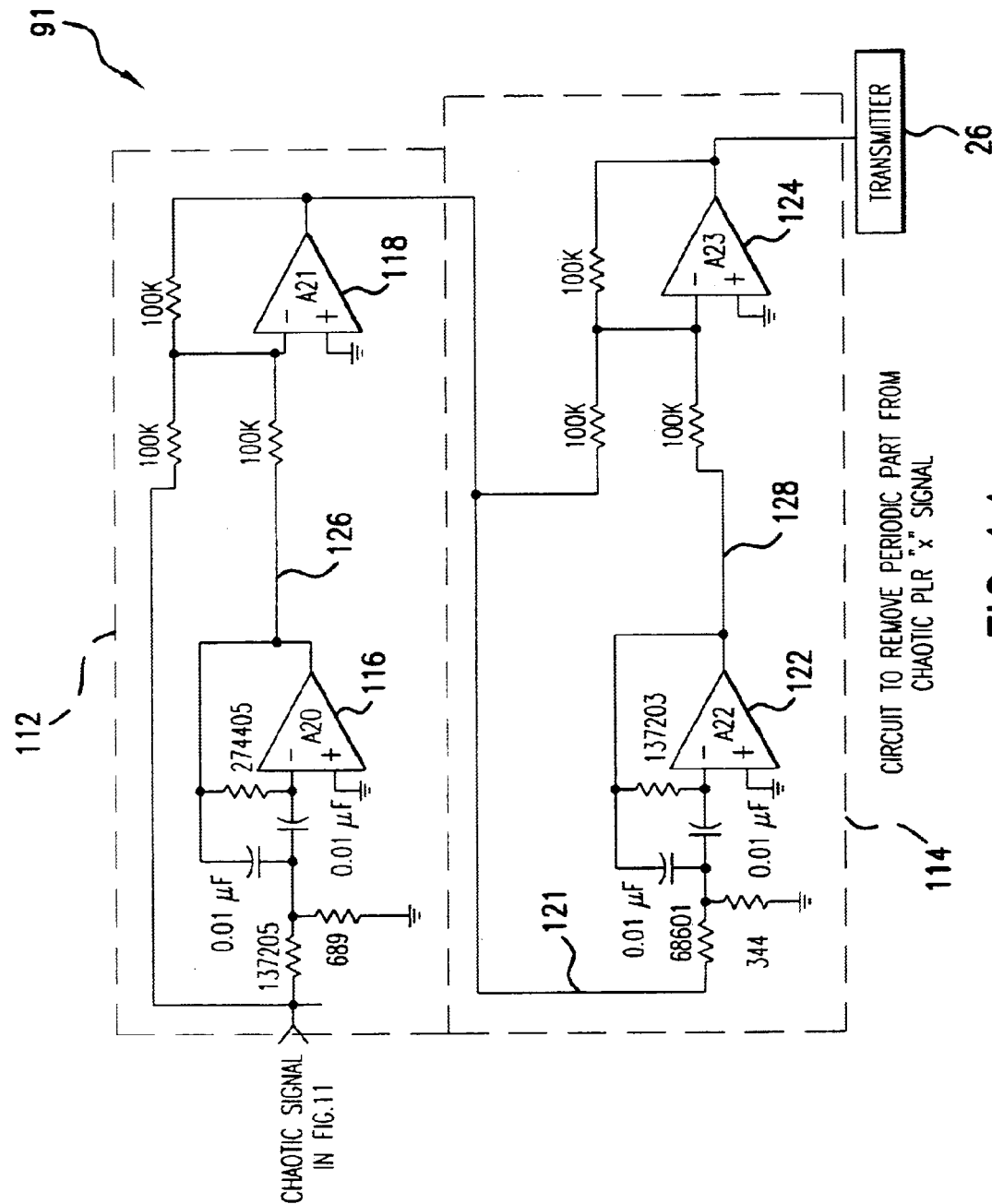
FIG. 14 shows a circuit used to remove the periodic part from the chaotic PLR "x" signal.
Figure 15:
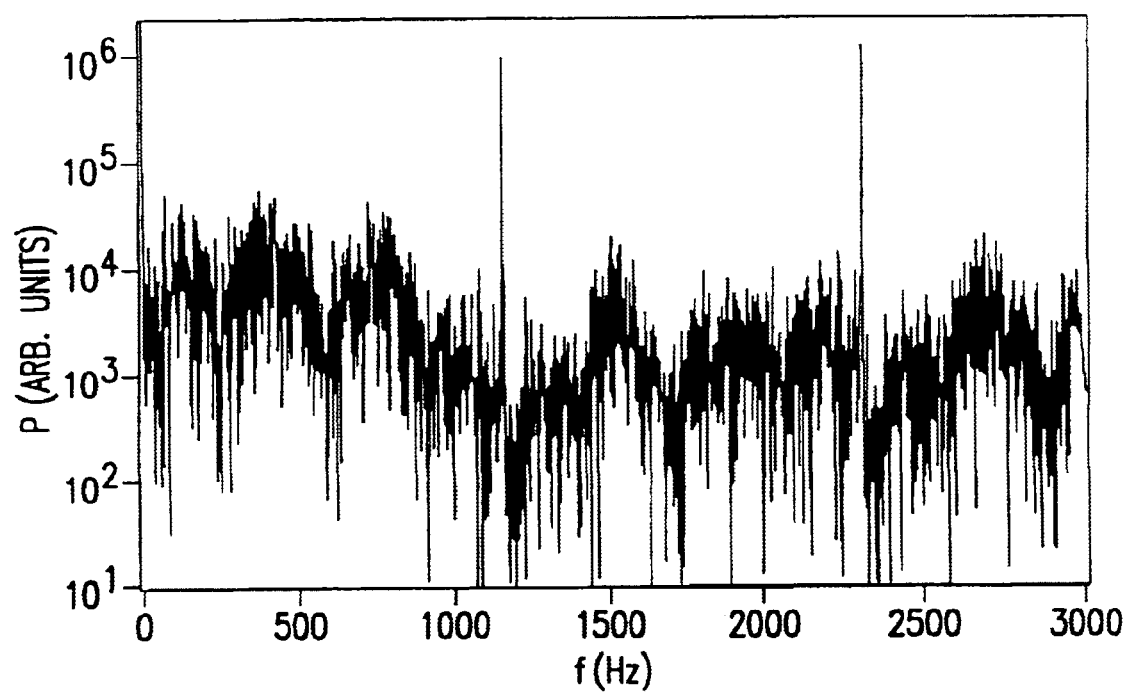
FIG. 15 shows a power spectrum of the output signal from an analog multiplier shown in FIG. 8 when the input signal comes from the chaotic PLR circuit.

There numerous methods for removing the periodic parts of a chaotic signal, however, only two will be discussed herein. The first method is by the use of a bandstop filter to filter out the periodic parts, as is shown in the first preferred embodiment, as shown in FIG. 14. The second method discussed is to generate another sine wave frequency signal of the input sinusoidal signal frequency and phase lock to the chaotic signal using a phase-lock loop, for example, and then subtracting out the periodic signal from the chaotic signal, as shown in the second preferred embodiment, as shown in FIG. 6. The signal that is left is pure broad-band without any periodic parts. Either of the signals, which may be at a the actual radio frequency (RF) frequency or a baseband frequency mixed with a RF signal, may then be transmitted out over a transmitter.

The output signal from the transmitter is a broadband signal, but information about the removed periodic parts is modulated onto the broadband signal. If the signal is squared, as shown in the following embodiments, the peak will be twice that of the driving frequency and even multiples. When cubed, there will be peaks at the driving frequency and at the odd harmonics.

There are many different methods for removing the periodic component from a chaotic signal. One may remove the periodic component directly with bandstop filters, or isolate the periodic component with bandpass filters and subtract from the chaotic signal, or reproduce the periodic component without a filter and subtract from the chaotic signal. In the noautonomous Duffing chaotic circuit 30, shown here in FIG. 2, the latter, reproducing the periodic components without filters, and subtracting from the chaotic signal is utilized.

Figure 2:
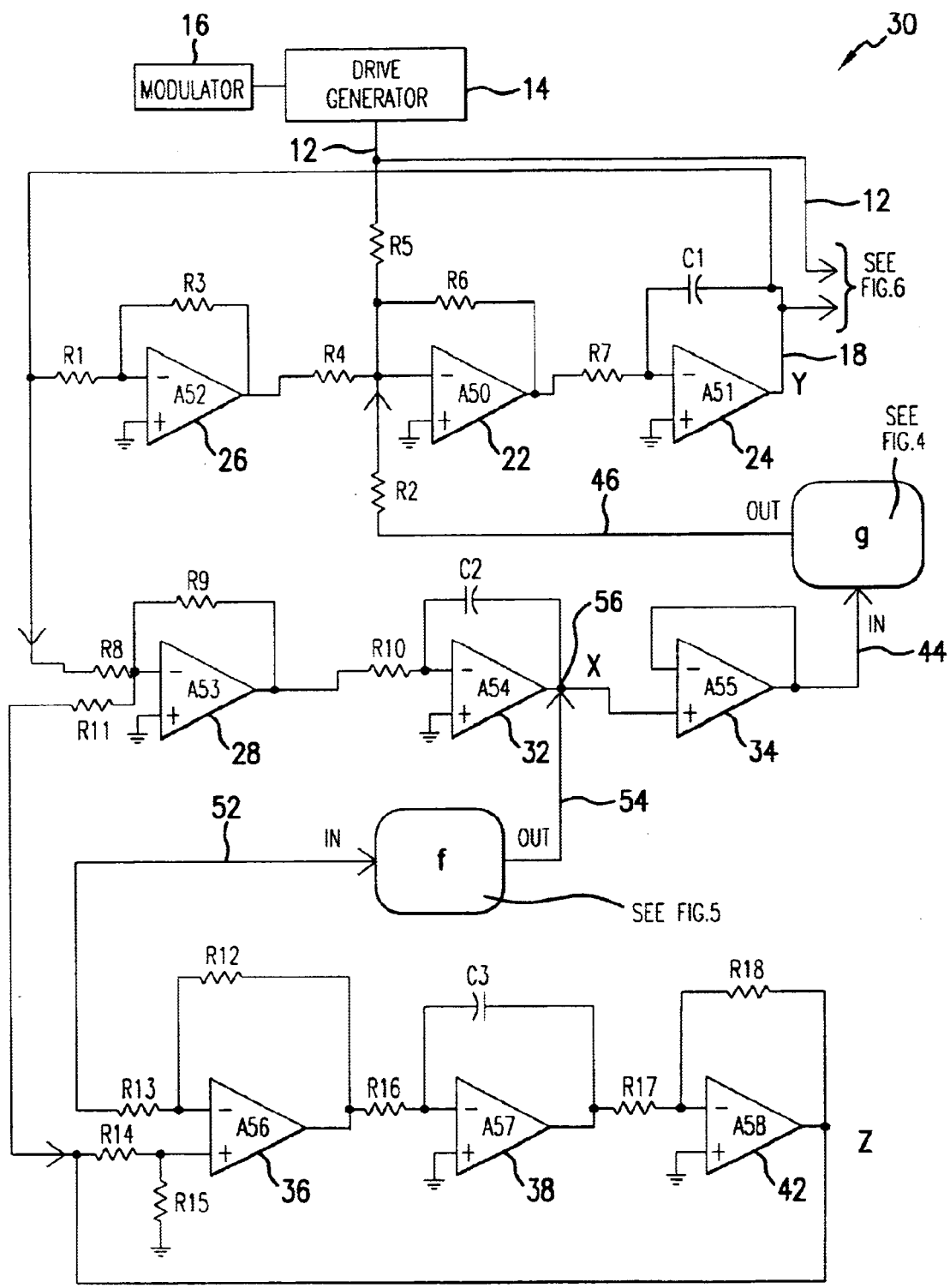
FIG. 2 shows a chaotic Duffing circuit.
Figure 3A:
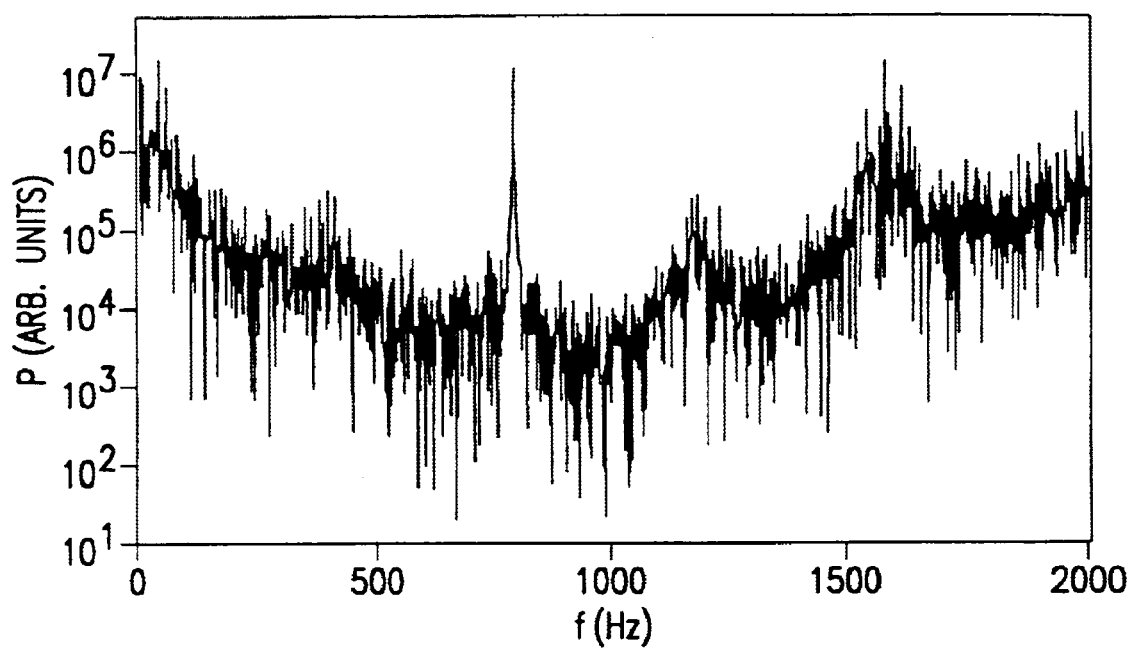
FIG. 3(a) shows a power spectrum of a "y" signal from the chaotic Duffing circuit.
Figure 3B:
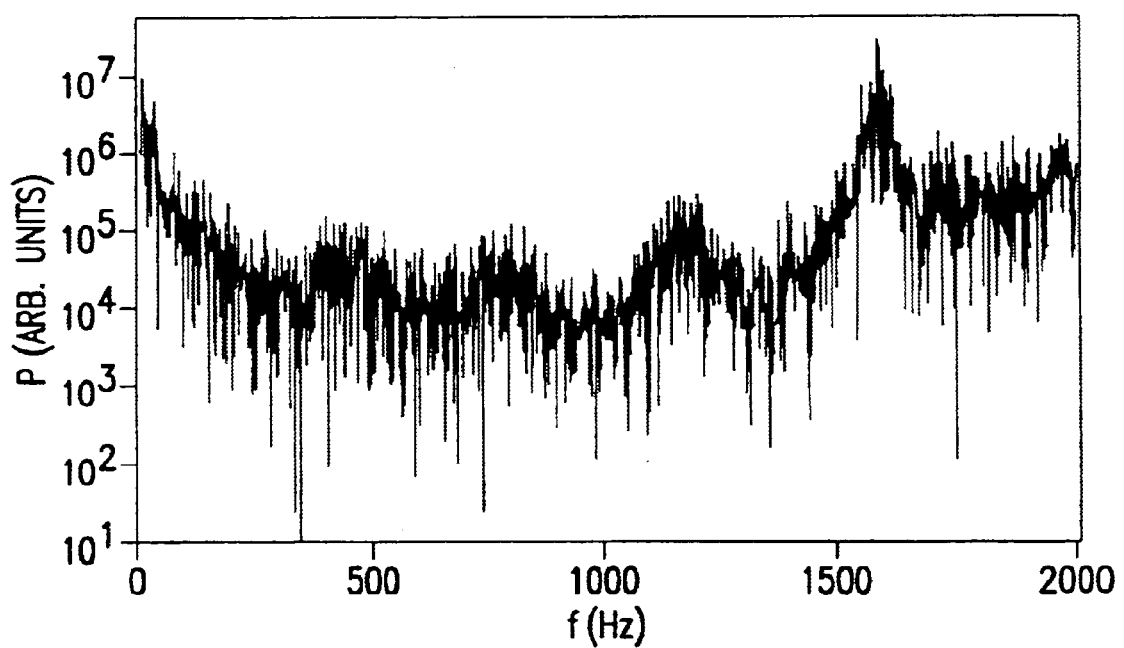
FIG. 3(b) shows a power spectrum of the "y" signal after periodic parts have been removed.

In the first preferred embodiment, a nonautonomous Duffing chaotic circuit 30, as shown in FIG. 2, is periodically driven by a sine wave signal 12 from a function generator 14, in this embodiment it is assumed to have a frequency of 780 Hz and an amplitude of 1.75 V. The sine wave signal 12 is modulated, either phase modulation or frequency modulation, within the function generator 14 by a modulator 16. The function generator 14 driving the Duffing circuit 30 may be phase or frequency modulated, however, modulation can occur elsewhere with external modulators. The modulated sine wave signal 12 drives a duffing circuit, and in this instance is assumed to be phase modulated in order to encode the information on a "y," signal 18. The modulated sinusoidal signal from the function generator 14 passes through a resistor into an operational-amplifier (op-amp) loop formed by operational-amplifiers A-50 22, A51 24, A52 26, A53 28, A54 32, A 55 34, A56 36, A57 38, and A 58 42 forming a series of interconnected feedback loops within the Duffing circuit which will be described mathematically at a later point. The signal exiting A51 24 in the first loop is the "y," signal 18. The "y" signal 18 is a chaotic signal which is broadband with periodic peaks within it is shown in FIGS. 3(a) and FIG. 3(b) shows a power spectrum of the "y" signal after periodic parts have been removed.

Figure 4:
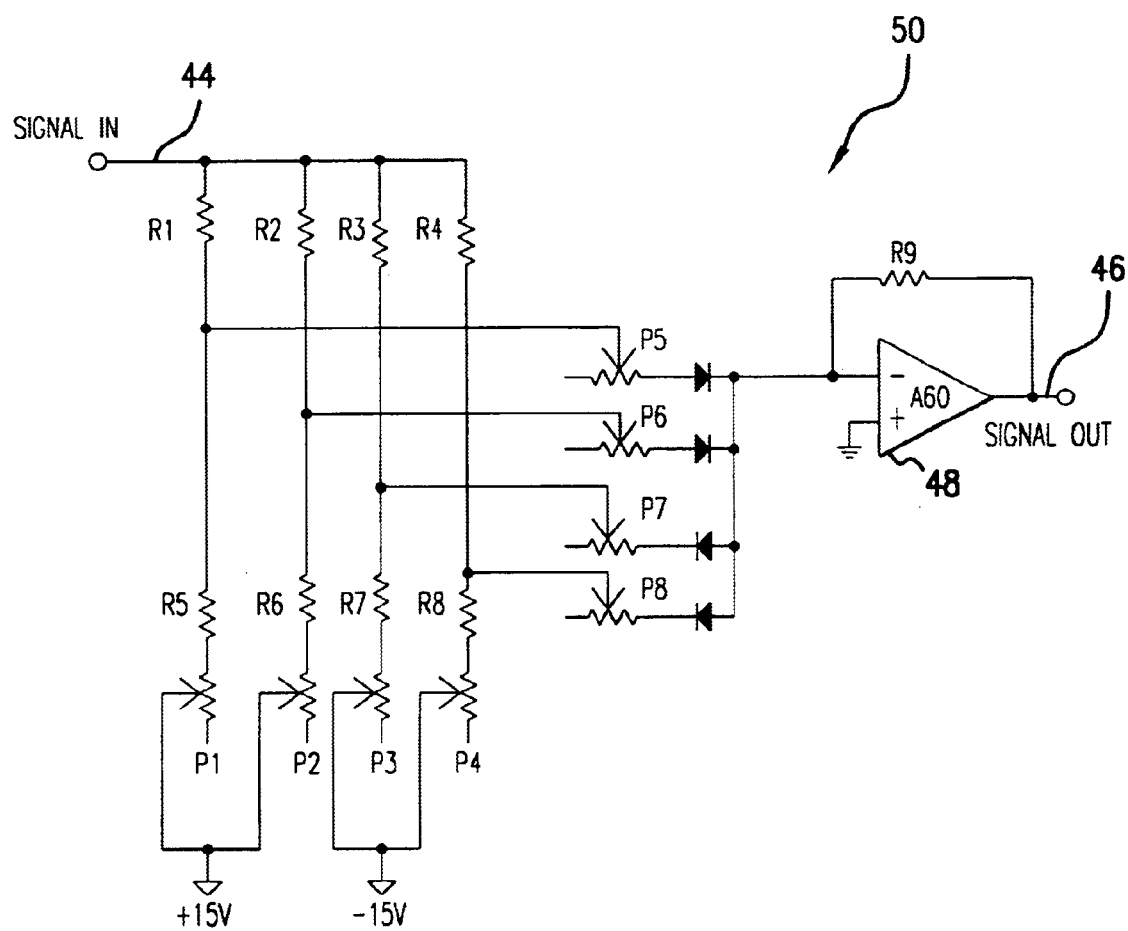
FIG. 4 shows a schematic of the circuit used to create the function F in the chaotic Duffing circuit.

In the second loop formed by operational-amplifiers A53 28, A54 32 and A55 34, apply the signal 44 to a circuit (FIG. 4) comprised of operational-amplifiers A60 48 and a combination of voltage dividers and diodes which develop the output signal 46, "G". Essentially in this circuit the signal is being turned ON and OFF to the amplifier A60 48. This is a linear approximation of a cubic function made up of line segments that is part of the chaotic circuit. However, as stated before nonlinearity is need to create chaos.

Figure 5:
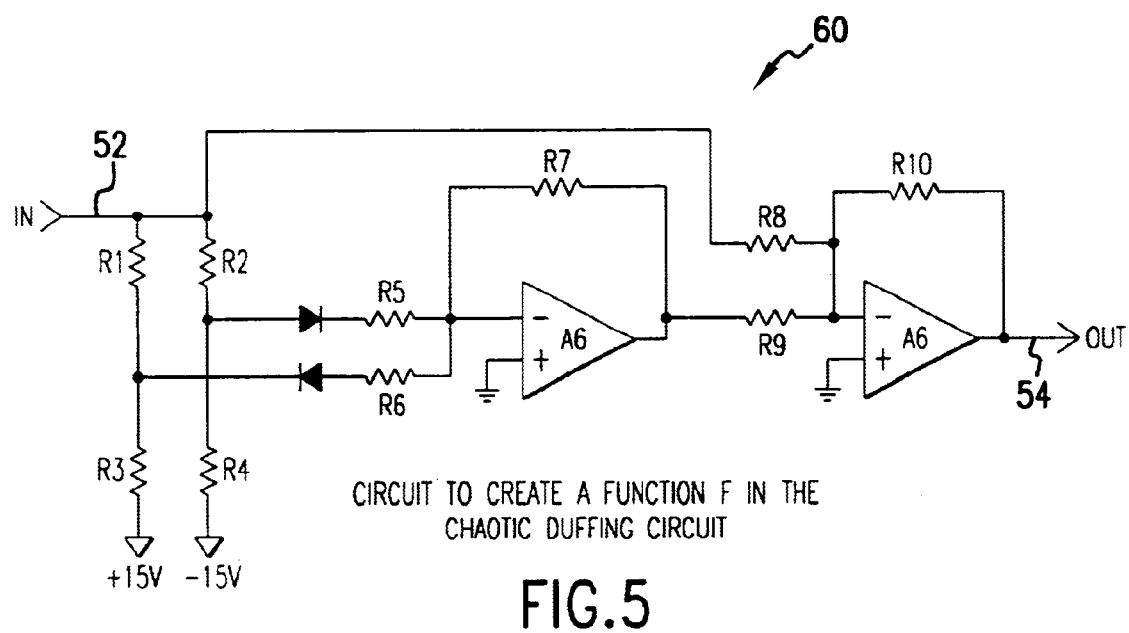
FIG. 5 shows a schematic of a circuit used to create the function G in the chaotic Duffing circuit.

The third loop creating the chaotic circuit is comprised of operational-amplifiers A56 36, A57 38 and A58 42 which apply a signal to the circuit in FIG. 5 to produce the output signal 54 which is fed back into the second loop at 56 forming the signal "X,". This loop can't easily break into loops. The circuit for removing the periodic component from the Duffing "y" signal 18 is shown in FIG. 6. The periodic driving signal 12 is input to operational-amplifier A1 64. Operational-amplifiers A1 64 and A2 66 are used to adjust the phase and amplitude of the periodic driving signal 12 so it matches the phase and amplitude of the components of the chaotic "y" signal 18 at 780 Hz.

Figure 7:
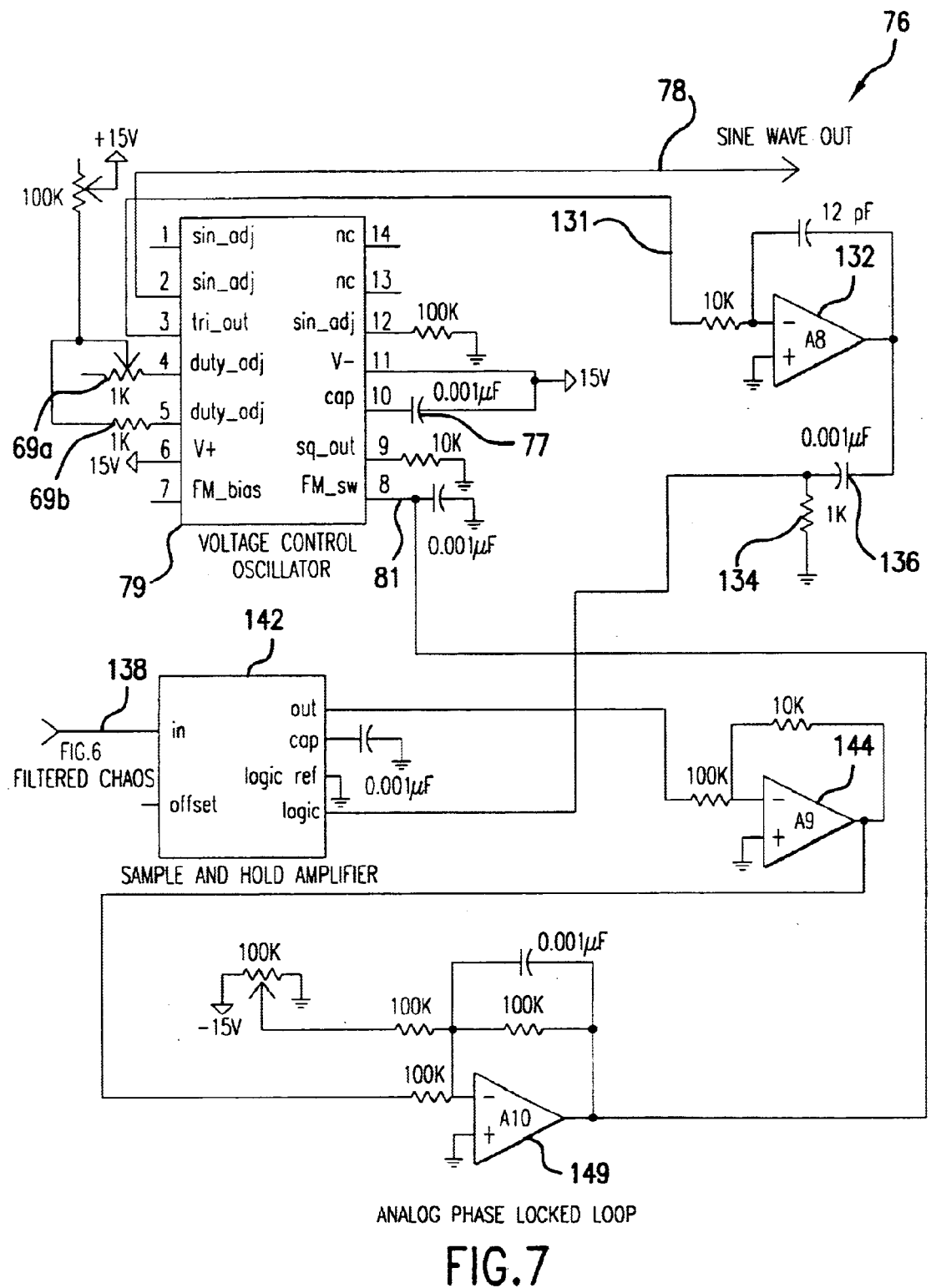
FIG. 7 shows a schematic of an analog phase locked loop from FIG. 6.

The chaotic signal output 18 of the first loop designated "y" is used as the chaotic input 18 to the circuit, shown in FIG. 6, at a point labeled 56. In this circuit the periodic components in the chaotic signal 18 are subtracted. Also, the modulated sinusoidal wave 12 from the functional generator 14 is applied to the same circuit at a point 58. Basically this circuit subtracts the driving frequency and its harmonics. From the chaos input 18 is applied directly to operational-amplifier A7 62. The sinusoidal input 12 is applied to a phase shifter, A1 64 to operational-amplifier A2 66 which controls the gain of the signal and thence to operational-amplifier A7 62 where it is subtracted from the chaotic signal 18. This action within A7 62 removes the periodic signal at the drive frequency. Operational-amplifiers A3 68 and A4 72 are both bandpass filters set to filter, or isolate, out the first harmonic of the chaotic duffing signal 18 or twice the driving frequency. The output of the operational-amplifier A4 72, a filtered signal 74 is then applied to an analog phase-locked loop (PLL) 76, as shown in FIG. 7, which produces a sinusoidal signal at 1560 Hz whose phase differs by some constant amount (possible zero) from the phase of the chaotic Duffing "y" signal 18 at 1560 Hz. The output signal 78 is a clear sine wave at the frequency of the first harmonic of the drive frequency.

The sine wave output 78 of the PLL 76 is applied to phase shifter 82 containing operational-amplifier A5 80 and scaled by operational-amplifier A6 82 to adjust the phase and amplitude before being subtracted from the chaotic Duffing "y"signal 18 signal by operational amplifier A7 62. The output 63 of operational-amplifier A7 62 is then provided to a transmitter 26. The power spectrum of the signal 63 output by operational-amplifier A7 62 is shown in FIG. 2(b) The periodic parts at 780 and 12560 Hz have been removed. For simplification here, only the first two periodic signals have been removed. It is possible to remove higher frequency parts of the chaotic signal using similar methods if necessary.

The analog phase locked loop circuit, as shown in FIG. 7, the voltage control oscillator 79 may be a device such as an ICL8038 chip. The ICL8038 has been found satisfactory for this device because it is an integrated circuit that produces sine, triangle and square waves. The frequency of the sine wave and other outputs may be determined by a capacitor 77 at pin 10, the resistors 69a and 69b at pins 4 and 5, respectively, and the signal input 81 at pin 8. The triangle wave 131 from pin 3 the voltage control oscillator 79 (CL8083) is input to operational-amplifier A8 132, which together with the capacitor 134 and resistor 136 that follow is used to produce a timing pulse when the sine or triangle wave outputs of the voltage control oscillator 79 (CL8083)) cross zero going in the negative direction. The frequency of the periodic outputs of the voltage control oscillator 79 (CL8083) is set to 1560 Hz. The timing pulse from operational-amplifier A8 132 drives a sample and hold amplifier 142, in this instance a LM398, which samples the filtered chaotic Duffing "Y" signal 18 that is input to the PLL 76 at 138. The output of the sample and hold amplifier 142 (LM398) is scaled by operational-amplifier A9 144 ans low pass filtered bu operational-amplifier A10 146 to produce a corrected signal which is input to pin 8 of the voltage control oscillator 79 (CL8083). The output of the voltage control oscillator 79 (CL8083), which is also the output of the PLL 76, is a sinusoidal signal that is phase locked to the filtered chaotic Duffing "y" signal 18 which is input to the IL 76.

Any known method may be used to transmit the signal 63 from operational-amplifier A7 62. The signal may be transmitted directly, or it may be combined with some other signal before transmission.

At the receiver 28, as shown in FIG. 1b, it is possible to detect the phase of the periodic part of the transmitted chaotic Duffing "y" signal 24 because the signal 24 is cyclostationary. The cyclostationarity may be detected by taking the autocorrelation function of the power spectrum, or, equivalently, taking the square of the received signal 24. Squaring the received chaotic Duffing "y"signal 24 (which has had the periodic parts removed) will yield a signal that has a component at twice the original driving frequency of 780 Hz. Any other nonlinear function, such as cubing, which includes a product of the received signal with itself, may also be used. If the received chaotic Duffing "y" signal 24 is cubed, a component is present at the driving frequency of 780 Hz.

Figure 8:
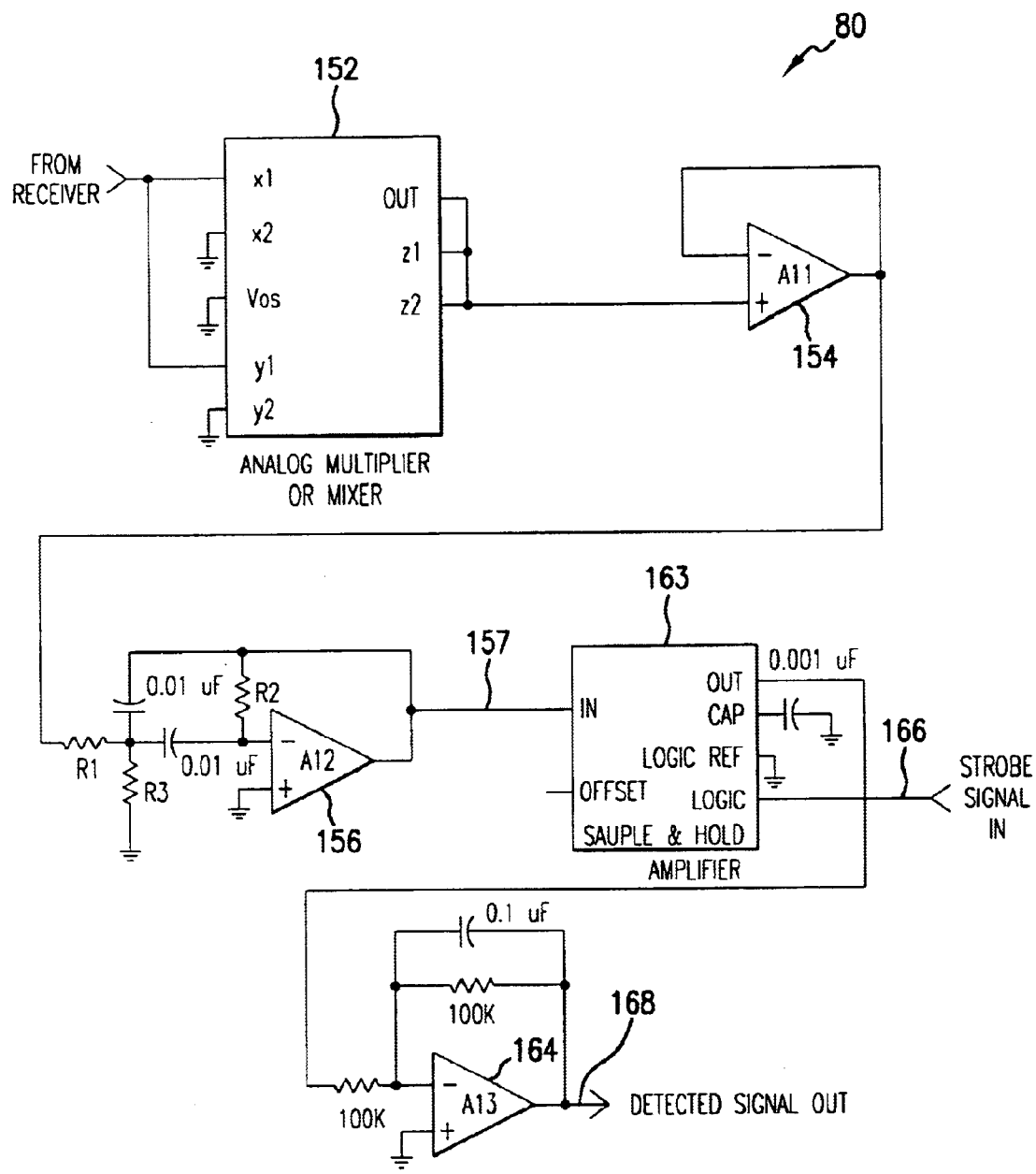
FIG. 8 shows a schematic of a circuit in a receiver that restores the periodic part of the chaotic signal.
Figure 9:
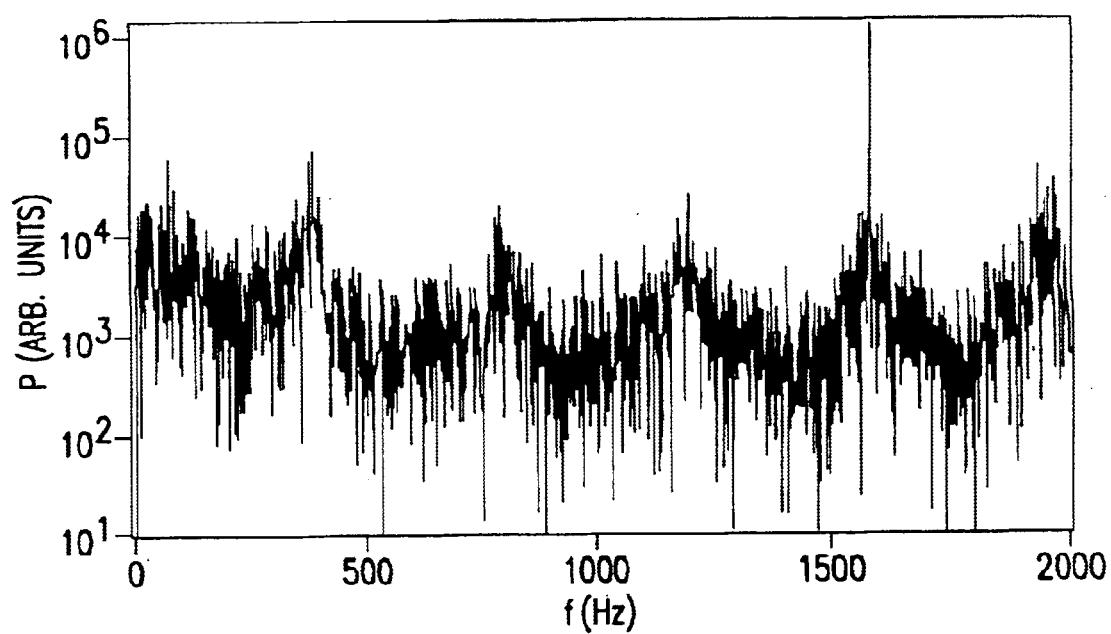
FIG. 9 shows a power spectrum of a circuit in the receiver that restores the periodic part of the chaotic signal.

FIG. 8 shows an information detection circuit 80. The transmitted chaotic Duffing "y" signal 24 may have been transmitted directly, as shown above, or it may have been combined with another signal before transmission. The receiver 28 outputs the chaotic Duffing "y" signal 32 after removing it from any signals it may have been combined with. An analog multiplier or mixer 152, in this instance a AD632 chip, produces the square of the signal 32 from the receiver 28. Operational-amplifier A11 154 is a buffer amplifier which isolates the multiplier 152 from later stages of the detection circuit 80. Operational-amplifier A12 156 is a bandpass filter. When the received signal 32 is a chaotic Duffing "y" signal, the bandpass filter is set to pass a frequency of 1560 Hz. It may be noted that other harmonics in the spectrum of the output of the multiplier 152, such as 2340 Hz and 3120 Hz, may also be used. The output of the bandpass detector 158 is input to a sample and hold amplifier 162, in this instance a LM398. The combination of the sample and hold amplifier 162(LM398) and operational-amplifier A13 164 act as a phase detector which detects the difference between the phase of the periodic part of the chaotic Duffing "y" signal 32 and the phase of a local oscillator 166. The strobe signal input, or the local oscillator, 166 to the sample and hold amplifier 163(AD632) is provided by a local pulse oscillator (not shown) running at a frequency of 1560 Hz. Operational-amplifier A13 164 is a low pass filter which low pass filters the output of the sample and hold amplifier 163(AD632) to produce the detected signal 168. FIG. 9 shows the power spectrum of the en output of the sample and hold amplifier 163(AD632).

Figure 10A:
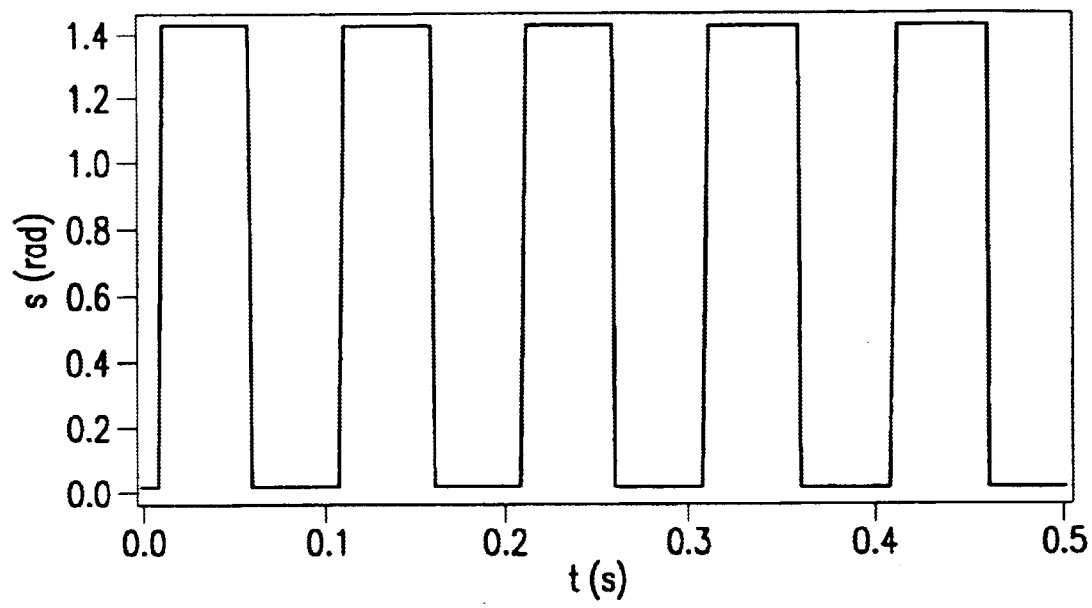
FIG. 10(a) shows an information signal "s" (in radians) used to modulate a sinusoidal driving signal which drives the chaotic Duffing signal.
Figure 10B:
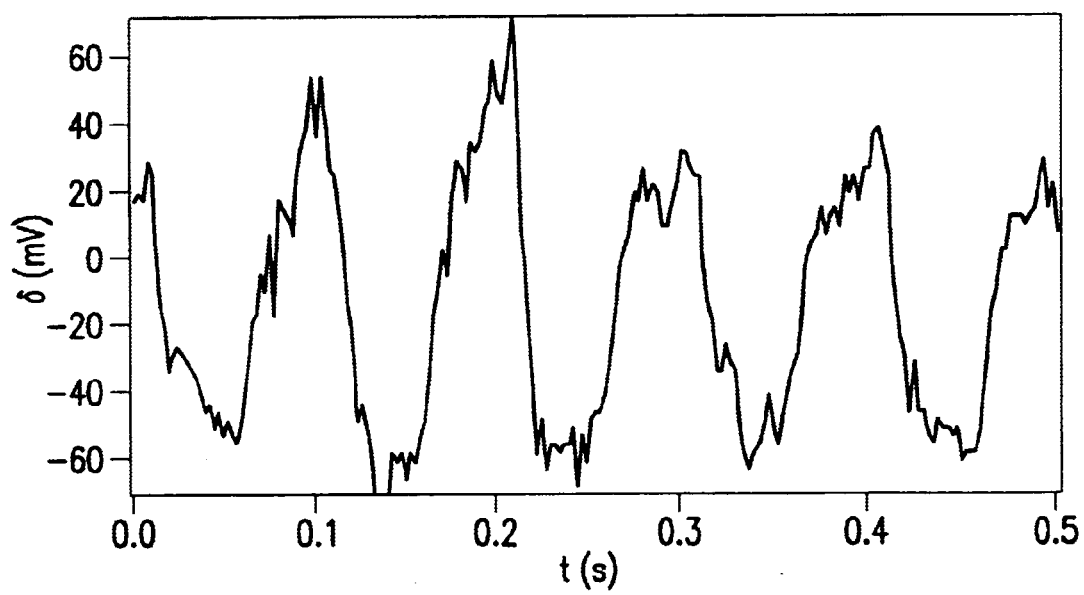
FIG. 10(b) shows an information signal δ detected at the receiver.

FIG. 10(a) shows a phase modulation signal applied to the function generator 14 generating the 780 Hz driving signal 12 for the chaotic Duffing circuit 30 ax shown in FIG. 2. The modulation frequency is 10 Hz. FIG. 10(b) shows a detected signal 32, demonstrating that the phase modulation was detected by the receiver 28, as shown in FIG. 1(b).

A numerical model of the Duffing circuit 30 having a frequency of 780 Hz and an amplitude of 1.75 V is as follows:

$$\frac{dx}{dt} = \alpha[y-z]$$
$$\frac{dy}{dt} = \alpha[-0.1y - g(x) + 2\sin(\theta)]$$
$$\frac{dz}{dt} = \alpha[f(x) - 0.1z]$$
$$\frac{d\theta}{dt} = \omega + \phi$$

$$g(x) = \begin{cases} 2x+3.8 & x < 12.6 \\ x+1.2 & -2.6 \leq x, -1.2 \\ 0 & -1.2 \leq X \leq 1.2 \\ X-1.2 & 1.2 < X \leq 2.6 \\ 2X-3.8 & X > 2.6 \end{cases} \quad (1)$$

$$F(X) = \begin{cases} X+2 & X < -2.6 \\ -X & -1 \leq X \leq 1 \\ X-2 & X > 1 \end{cases}$$

The periodic driving signal is $\theta$, with a frequency $\omega = (2\pi) \times 780$ rad/sec, and the phase of the driving signal is given by $\phi$. The time constant $\alpha$ is set to $10^4$ to simulate the same time scale as the circuit.

The transmitted signal here is assumed to be the "y" signal. The phases and amplitudes of the component of y at 780 Hz and the first four harmonics of 780 Hz are measured from the y signal so that the periodic parts of y could be subtracted. The signal transmitted is y, where $$y_s = y - \sum_{i=1}^{s} a_i \sin(i\theta - \phi_i) + \eta \quad (2)$$

where the phase and amplitude constants are give by

| in | $a_i$ | $\phi_i$ |
|---|---|---|
| 1 | 0.6516 | 0.0943 |
| 2 | 0.1407 | 0.3741 |
| 3 | 0.2027 | 1.9559 |
| 4 | 0.0662 | 0.7032 |
| 5 | 0.0716 | 2.4081 | and $\eta$ is an additive Gaussian white noise term.

At the receiver, y is squared and filtered with a bandpass filter with a center frequency of 1560 Hz:

$$\frac{du}{dt} = \frac{-y_s^2}{r_1 c} - \frac{u}{r_2 c} + v$$
$$\frac{dv}{dt} = \frac{-u(r_1 + r_3)}{r_1 r_2 r_3 c^2} \quad (3)$$

where u is the filter output and $r_1 = 102,000$ ohms, $r_2 = 204,000$ ohms, and $r_3 = 513$ ohms.

The next step in the receiver is to determine the phase of u. The signal $s_u$ is generated, where $s_u = 1$ for $u \geq 0$ and $s_u = -1$ for $u < 0$. This signal $s_u$ is used to strobe a sinusoidal signal at 1560 Hz:

$$\frac{d\theta_r}{dt} = \omega$$
$$\Delta = \sin(2\theta_r)|_{s_u = 0\uparrow} \quad (4)$$
$$\frac{d\delta}{dt} = 1000(\Delta - \delta)$$

where $\omega$ is the same as in Eq.(1) and $\Delta$ is produced by sampling $\sin(\theta_r)$ when $s_u$ crosses zero in the positive direction. The final phase error signal is a, which is the low pass filtered version of A.

An information signal was modulated onto the chaotic attractor by switching the additive phase constant $\phi$ in Eq. (1) between 0 and 1 radian. The level of the additive noise term $\eta$ in Eq.(2) can be varied to simulate different noise levels. The probability of bit error Pb as a function on then energy per bit/noise power spectral density ($E_r/N_o$) is plotted FIG. 17. The probability of bit error for this invention is good compared to other conventional techniques. While better results could be obtained using a purely periodic carrier signal, the periodic carrier would interfere with other communications signals and therefore is not allowed in the unlicensed band by the Federal Communications Commission.

Figure 11:
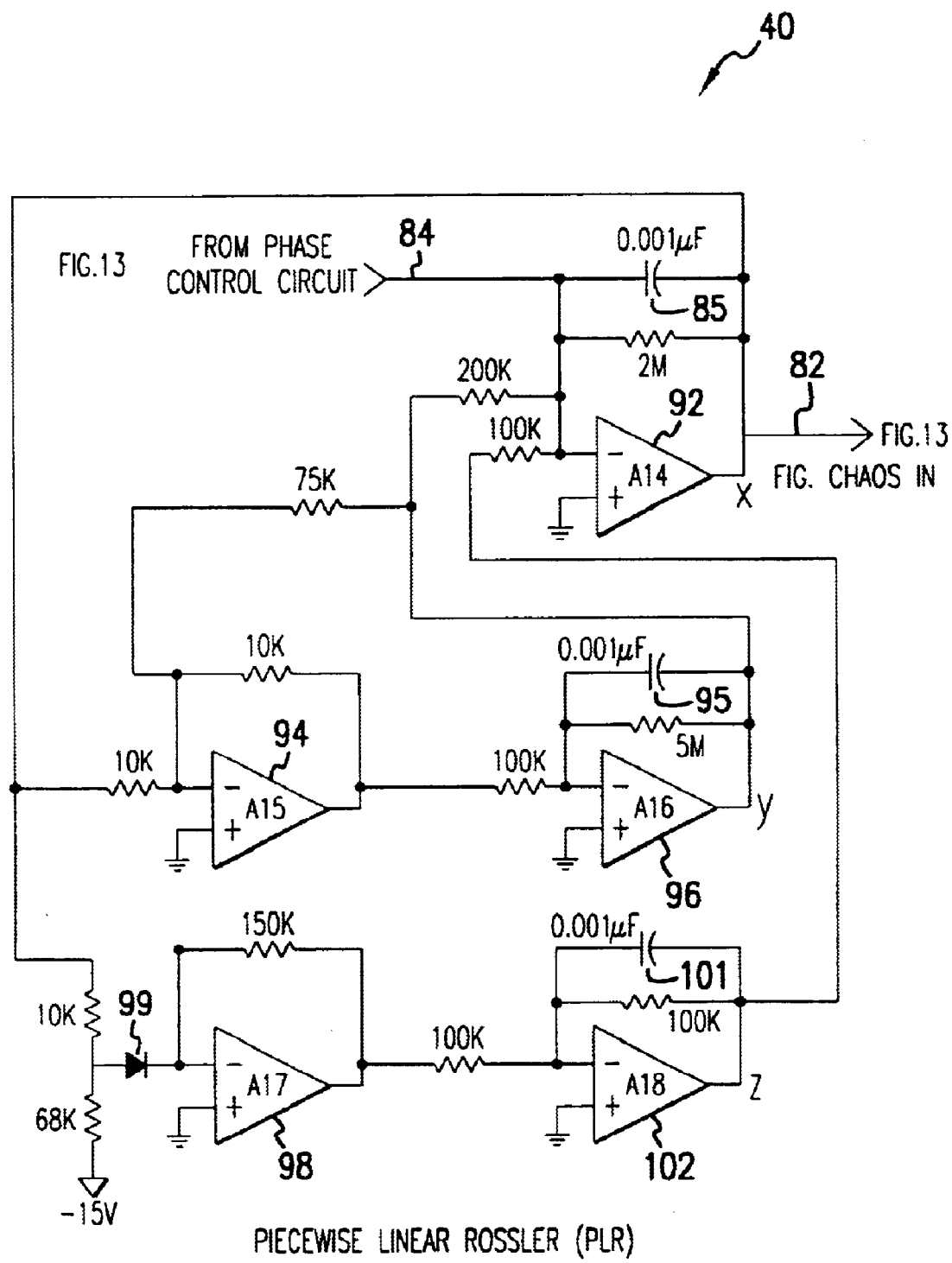
FIG. 11 shows a chaotic piecewise linear Rossler (PLR) circuit.
Figure 13:
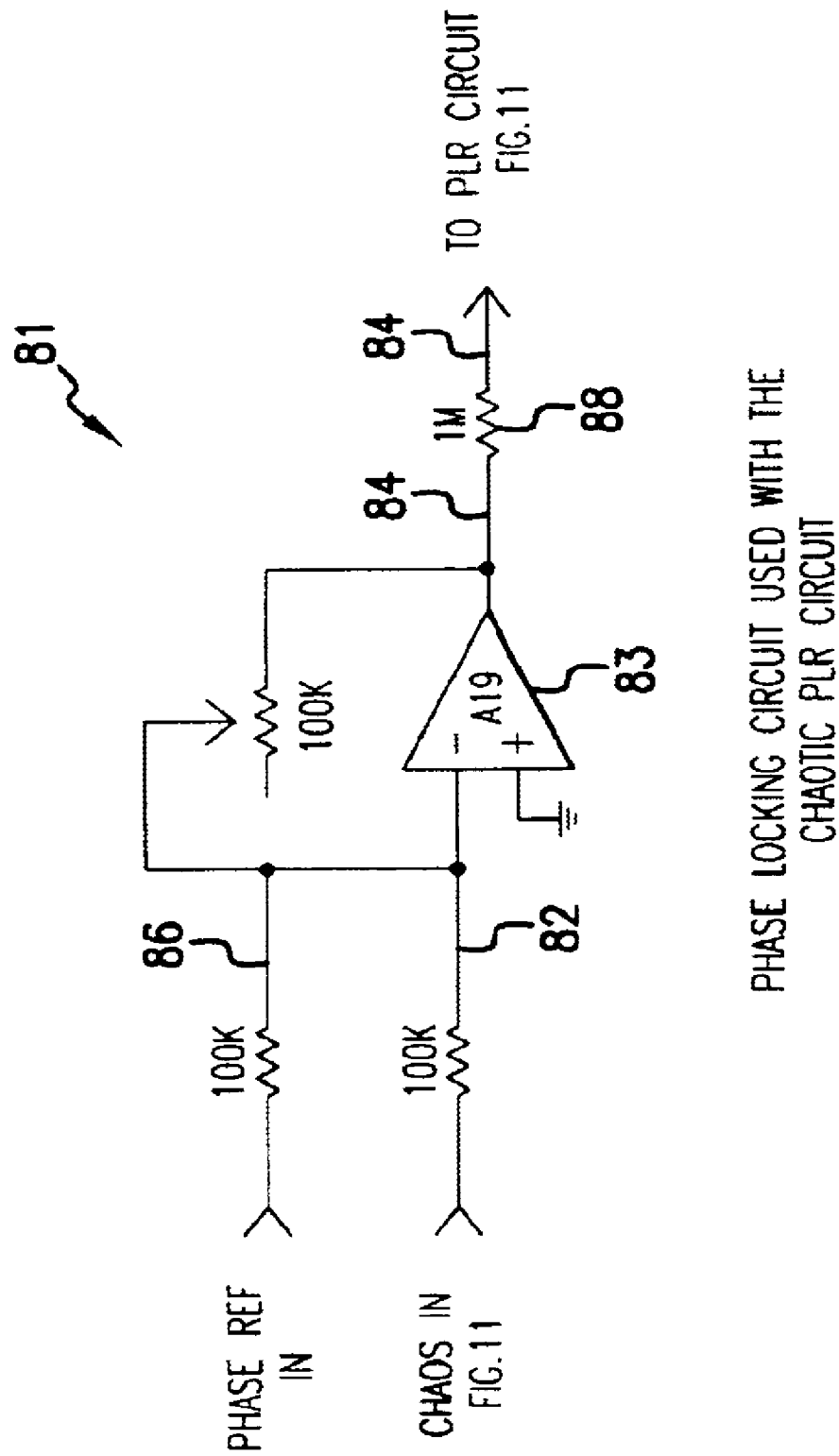
FIG. 13 shows a phase locking circuit used with the chaotic PLR circuit

In a second preferred embodiment, a piecewise linear Rossler (PLR) circuit 40, as shown in FIG. 11, an autonomous chaotic circuit, is another method for generating a chaotic signal. The PLR 40 oscillates by itself, therefore it does not have a driving signal. The PLR 40 does have strong periodic components that are capable of having their phase controlled. This signal is provided at the chaos input 82 of the phase control circuit 81, as shown in FIG. 13. A periodic phase reference signal is provided by a signal generator (not shown) to input 86 and is processed through operational amplifier 83 A19 that takes the difference, scaled to whether it is larger or smaller than the input signal. The scaled signal 84 is then fed back through a resistor 88 to the PLR circuit 40. Because there is no periodic signal driving the chaotic PLR 40 circuit, the phase of the periodic must be modulated in some other way, in order to modulate the phase, a well known technique called chaotic phase synchronization is used. The difference between a sinusoidal signal with frequency 1150 Hz and amplitude 3.15 V and the chaotic PLR 86×signal 82, as shown in FIG. 13, is input 84 to operational-amplifier A14 92, as shown in FIG. 11. The average phase of the chaotic PLR 40 circuit will then lock to the phase of the periodic reference signal. The overall effect on the dynamics of the acoustic PLR circuit 40 is very small.

A phase synchronization circuit 81 is shown in FIG. 13.

In the Rossler circuit 40, the signal path is a nonlinear target with feedback loops. The output signal from operational-amplifier A14 92, denoted by an "x", is feedback to operational amplifiers A15 94 and A16 96 which produces a signal, denoted by "y", which is then feedback to combine with the signal X from operational amplifier A14 92 and also is feedback to operational amplifiers A17 98 and A18 102 to produce a signal, denoted by "z", which also is feed back to operational amplifier A 14 92 to combine with signal "x". "x", "y", and "z" being broadband chaotic signals.

Figure 12A:
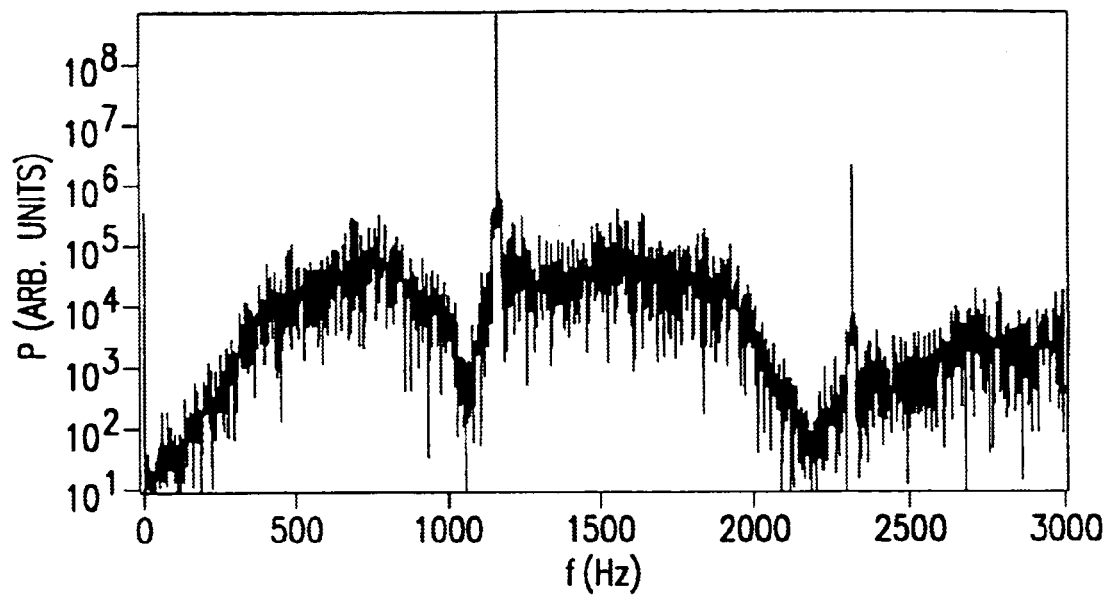
FIG. 12(a) shows a power spectrum of an "x" signal from the chaotic PLR circuit.

The power spectrum of the "x" signal 82 from the PLR circuit is shown in FIG. 12a. It will be noticed that there are large narrow band components at 1150 Hz and its harmonics.

Referring to FIG. 11, as the operational-amplifier A14 92 adds together the signals on the input 84 it also acts as a wave integrator because of the capacitor 85 in the feedback circuit. When the signal is applied to A16 96 it is actually a weighted integral and operational amplifier A17 98 generates a nonlinear function of the input signals because of the diode 99.

Referring again to FIG. 13, A19 83 acts as a summer of the input signals 82 and 86.

Figure 12B:
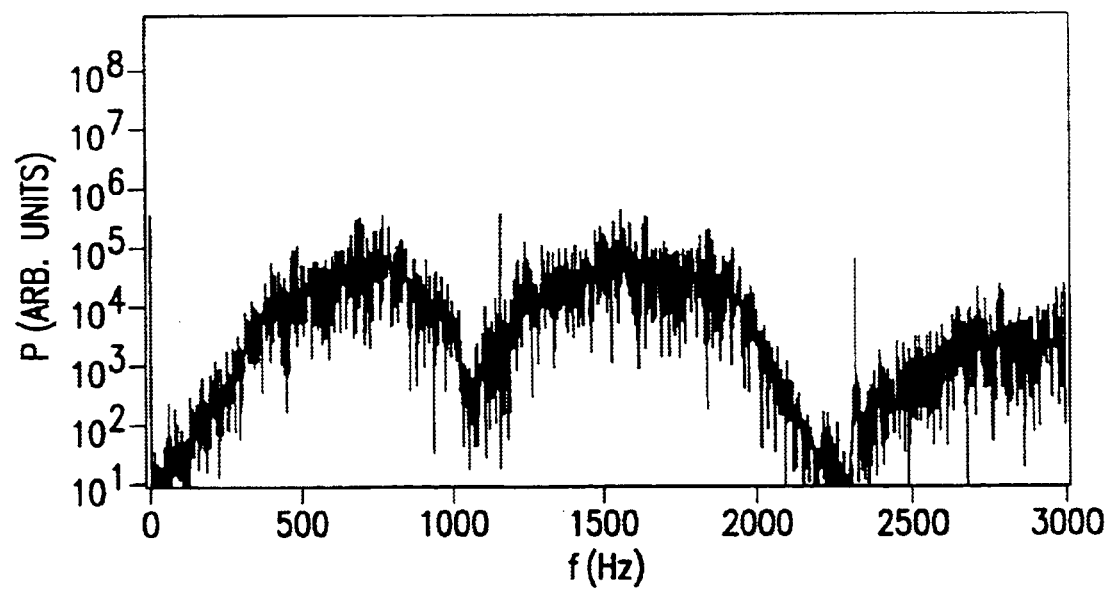
FIG. 12(b) shows a power spectrum of the "x" signal from the PLR circuit after the periodic parts have been removed.

A different method for removing the periodic component from the chaotic signal in the Rossler circuit 40 is shown in FIG. 14 wherein bandpass filters are used to remove the periodic parts from the signal. The chaotic PLR 86×signal 82 is input to operational-amplifier A20 116, which forms a bandpass filter with a center frequency of 1150 Hz. Operational-amplifier A21 118 then subtracts the bandpass filter output 126 from the chaotic PLR 86×signal 82. The output of A21 118 is then input 121 to A22 122, which forms a bandpass filter with a center frequency of 2300 Hz. Operational-amplifier A23 124 then subtracts the output 128 of A22 122 from the output 121 of A21 118, creating a signal with components at 1150 Hz and 2300 Hz removed. The power spectrum of this signal is shown in FIG. 12(b). It is also possible to remove higher harmonics of the periodic signal if desired. The chaotic PLR 86×signal 82 with periodic parts removed then goes to a transmitter 26, where it may be transmitted directly or combined with other signals before transmission.

Therefore, the foregoing is essentially a pair of bandpass filters 112 and 114 utilizing operational-amplifiers A20 116 and A22 122 as a bandpass filter component to isolate certain frequency bands from the Rossler signal. These signals are where the large peaks are in the Rossler signal, so the filter outputs 126 and 128 are subtracted from the Rossler signal and when combined with operational amplifiers A 21 118 and A 23 124, respectively, the circuit acts as a bandstop filter.

Figure 16A:
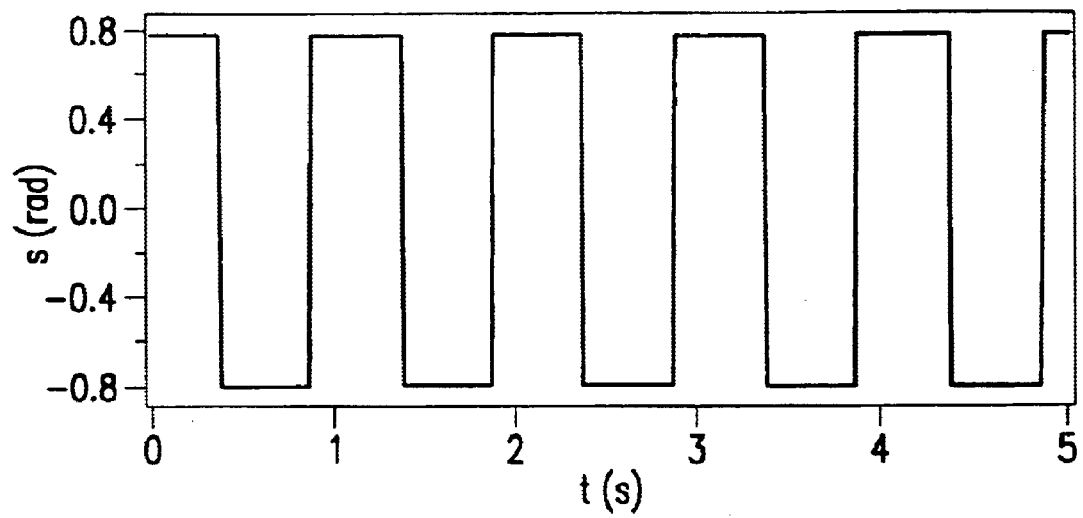
FIG. 16(a) shows an information signal "s" (in radians) used to phase modulate a sinusoidal reference signal used with the chaotic PLR circuit.
Figure 16B:
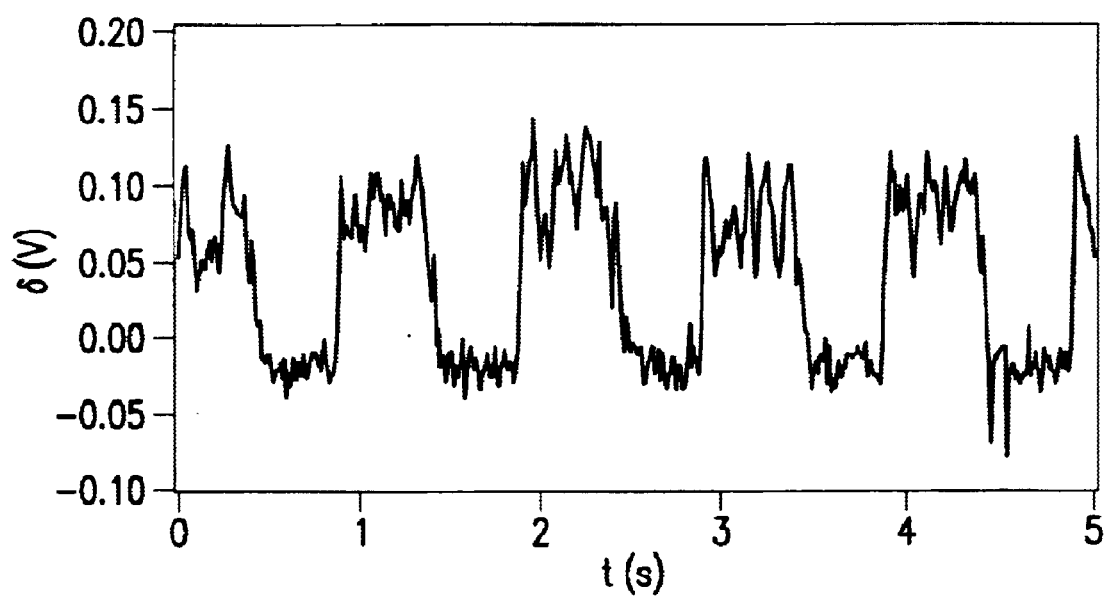
FIG. 16(b) shows a detected signal δ from a detector circuit.

The receiver functions as previously stated, as shown in FIG. 8, except that the bandpass filter using operational-amplifier A12 156 is centered at 2300 Hz. Otherwise, the periodic part of the signal is reconstructed as before, and the phase modulation is detected. " " shows the power spectrum of the output of the analog multiplier or mixer 152 (AD632) in the detector circuit 80, as shown in FIG. 8. FIG. 16(a) shows the phase modulation used to phase modulate the periodic reference signal, while FIG. 16(b) shows the detected modulation signal. The modulation frequency is 1 Hz.

Figure 17:
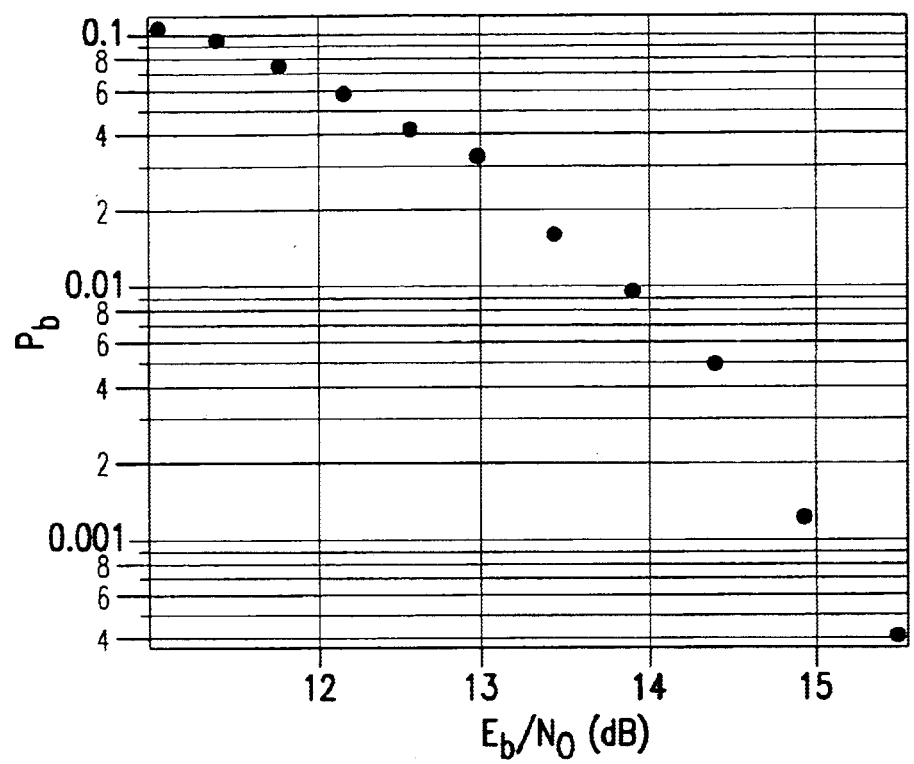
FIG. 17 shows a probability of bit error, $P_b$, as a function of $E_b/N_o$ (energy per bit/noise power spectral density) for a simulation of the chaotic Duffing system.

FIG. 17 shows the performance of the system, the X-axis is energy per bit divided by noise power spectral density. This energy is divided by the noise power spectral density because there is always noise present and it is desired that the measure of the quantum of the signal being sent compared to the noise background.

The y-axis is the probability of bit error. In sending a digital or binary signal, a 1 or a 0, it is desirable to know the probability a 1 was sent, even though it was intended to send a 0. The highest this probability can be 0.5 because there are only two possibilities. This is shown as such because there is more energy per bit and the lower probability of making an error. A worse signal is transmitted when there is more noise.

Figure 18:
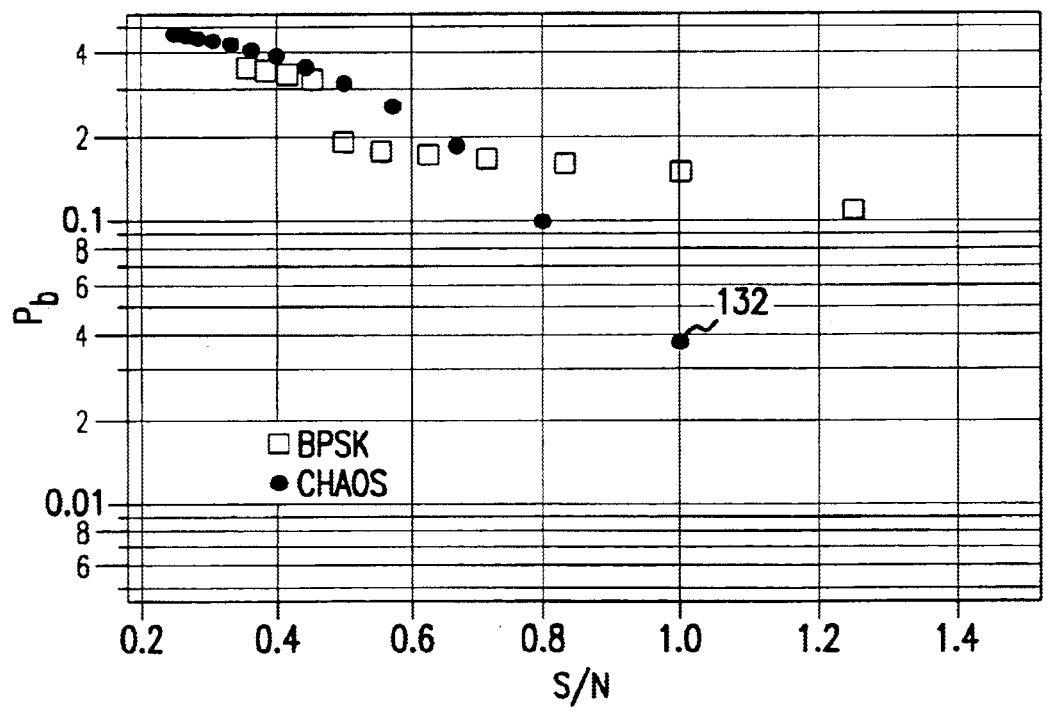
FIG. 18 shows a probability bit error, Pb, as a function of signal amplitude/noise amplitude when an interfering carrier with a frequency 1% greater has been added to a main carrier.

FIG. 18 shows a comparison between the Duffing system and Bipolar Phase A Shift Keying (BPSK) with a frequency 1% different from the drive signal of what happens if there is a periodic interference signal. If a periodic signal is being transmitted on a nearby frequency, it is desirable that the frequency of interest not be interfered with. The black circles, such as 132, are the performance of the above stated method and the x-axis is actual signal-to-noise ratio. This presents how large the signal of interest is when compared to the interfering signal sine waves. The Y-axis is again the probability of bit error. The squares are a well known BPSK method, which does not perform as well when the interference is larger than the signal.

The 780 Hz from the signal generator is an arbitrary signal frequency for design purposes of circuit design. A different frequency may be used and the circuit components rescaled to move the circuit frequency up or down. Further, the design of the circuit may be varied, there are many variations of circuits that will generate a chaotic signal, the theory behind the device taught here is purely mathematical, A chaotic signal may also be generated by a computer and then transmit the results to a transmitter.

In order for this invention to be useful, it must be possible to have multiple transmitters and receivers. To create multiple transmitters, each transmitter must have a chaotuc circuit driven at a different frequency (for autonomous systems, each transmitter will have a different peak frequency). The number of users within a given bandwidth will be the same as for a purely periodic communications system.

Other types of modulation besides phase modulation are possible. The periodic part of the chaotic signal may also be phase or amplitude modulated, for example, as long as the modulation does not put the transmitter into a nonchaotic state or exceed the range of the part of the circuit that removes the periodic signal. The performance in terms of probability of bit error should be the same for other types of modulation, but the bandwidth efficiency of the system will be improved.

Although this invention has been described in relation to an exemplary embodiment thereof, it will be understood by those skilled in the art that still other variations and modifications can be affected in the preferred embodiment without detracting from the scope and spirit of the invention as described in the claims.

What is claimed is:

1. A device for producing a broadband communications signal comprised of:
   a chaotic circuit modulated by an informational signal;
   a circuit to remove a periodic part of the chaotic signal to produce a broad-band communications signal without any periodic parts;
   a transmitter for transmitting the broadband signal with periodic parts removed;
   a receiver for receiving the transmitted broadband signal with periodic parts removed;
   a nonlinear operator circuit for reconstructing the periodic part of the chaotic signal; and
   a demodulator for demodulating the informational signal contained in the chaotic signal.

2. A device, as in claim 1, wherein the demodulator is a phase demodulator.

3. A device, as in claim 1, wherein the demodulator is a frequency demodulator.

4. A device, as in claim 1, wherein the circuit to remove a periodic part of the chaotic signal to produce a broadband communications signal without any periodic parts is a nonautonomous Duffing chaotic circuit.

5. A device, as in claim 1, wherein the circuit to remove a periodic part of the chaotic signal to produce a broadband communications signal without any periodic parts is a piecewise linear Rossler circuit.

6. A device for producing a broadband communications signal comprised of:

a chaotic circuit modulated by an informational signal;

a circuit which produces periodic signals in order to remove a periodic part of the chaotic signal to produce a broadband communications signal without any periodic parts;

a transmitter for transmitting the broadband signal with periodic parts removed;

a receiver for receiving the transmitted broadband signal with periodic parts removed;

a nonlinear operator circuit for reproducing the periodic part of the chaotic signal to produce a replica of the informational signal; and a phase demodulator for demodulating the informational signal containing the chaotic signal.

7. A device for producing a broadband communications signal comprised of:

a chaotic circuit modulated by an informational signal;

a filter circuit to remove a periodic part of the chaotic signal to produce a broadband communications signal without any periodic parts;

a transmitter for transmitting the broadband signal with periodic parts removed;

a receiver for receiving the transmitted broadband signal with periodic parts removed;

a nonlinear operator circuit for replacing the periodic part of the chaotic signal to produce a replica of the informational signal; and a frequency demodulator for demodulating the informational signal containing the chaotic signal.

8. A device for producing a broadband communications signal comprised of:

a chaotic circuit modulated by an informational signal;

piecewise linear Rossler circuit to remove a periodic part of the chaotic signal to produce a broadband communications signal without any periodic parts;

a transmitter for transmitting the broadband signal with periodic parts removed;

a receiver for receiving the transmitted broadband signal with periodic parts removed;

a nonlinear operator circuit for replacing the periodic part of the chaotic signal to produce a replica of the informational signal; and a frequency demodulator for demodulating the informational signal containing the chaotic signal.

9. A device for producing a broadband communications signal comprised of:

a chaotic circuit modulated by an informational signal;

piecewise linear Rossler circuit to remove a periodic part of the chaotic signal to produce a broadband communications signal without any periodic parts;

a transmitter for transmitting the broadband signal with periodic parts removed;

a receiver for receiving the transmitted broadband signal with periodic parts removed;

a nonlinear operator circuit for replacing the periodic part of the chaotic signal to produce a replica of the informational signal; and a phase demodulator for demodulating the informational signal containing the chaotic signal.

10. A method for producing a broadband communications signal comprised of the steps of:

producing a chaotic circuit modulated by an informational signal;

removing a periodic part of the chaotic signal piecewise linear Rossler circuit to produce a broadband communications signal without any periodic parts;

transmitting the broadband signal with periodic parts removed;

receiving the transmitted broadband signal with periodic parts removed;

replacing the periodic part of the chaotic signal to produce a replica of the informational signal using a nonlinear operator circuit for; and demodulating the informational signal containing the chaotic signal using.

* * * * *